United States Patent
Jiang et al.

(10) Patent No.: US 8,626,892 B2
(45) Date of Patent: Jan. 7, 2014

(54) METHODS AND DEVICES FOR MANAGING A NETWORK

(75) Inventors: Dan Jiang, Shanghai (CN); Mo Li, Shanghi (CN)

(73) Assignee: Koninklijke Philips N.V., Eindhoven (NL)

( * ) Notice: Subject to any disclaimer, the term of this patent is extended or adjusted under 35 U.S.C. 154(b) by 294 days.

(21) Appl. No.: 12/990,511

(22) PCT Filed: Apr. 28, 2009

(86) PCT No.: PCT/IB2009/051723
§ 371 (c)(1),
(2), (4) Date: Nov. 1, 2010

(87) PCT Pub. No.: WO2009/136316
PCT Pub. Date: Nov. 12, 2009

(65) Prior Publication Data
US 2011/0047260 A1     Feb. 24, 2011

(30) Foreign Application Priority Data

May 5, 2008 (CN) .......................... 2008 1 0095250

(51) Int. Cl.
*G06F 15/173* (2006.01)
(52) U.S. Cl.
USPC ............................. 709/223; 709/224; 709/225
(58) Field of Classification Search
USPC ......................................... 709/223, 224, 225
See application file for complete search history.

(56) References Cited

U.S. PATENT DOCUMENTS

| | | | |
|---|---|---|---|
| 6,400,725 B1 * | 6/2002 | Ross | 370/445 |
| 6,545,980 B1 * | 4/2003 | Dive et al. | 370/242 |
| 2001/0034228 A1 | 10/2001 | Lehtovirta et al. | |
| 2003/0005130 A1 | 1/2003 | Cheng | |
| 2003/0093505 A1 * | 5/2003 | Waldo et al. | 709/220 |
| 2007/0091887 A1 * | 4/2007 | Ko et al. | 370/389 |

FOREIGN PATENT DOCUMENTS

| | | |
|---|---|---|
| EP | 0847220 A2 | 6/1998 |
| WO | 0077636 A1 | 12/2000 |
| WO | 2008040617 A1 | 4/2008 |

OTHER PUBLICATIONS

US 6,081,813, 06/2000, Wollrath et al. (withdrawn).

* cited by examiner

*Primary Examiner* — Ian N Moore
*Assistant Examiner* — Hien Nguyen

(57) ABSTRACT

The present invention proposes a method of managing a network comprising a set of devices for transmitting a traffic stream using network resources. Each device of the set of devices is individually associated with an expiration time. The expiration time defines a maximum interval of sending a message by a given device among the set of devices for indicating that the given device is connected with the network. The method comprises a step of determining, based on the expiration times of said set of devices, a transmission lease time defining duration of using said network resources.

2 Claims, 4 Drawing Sheets

METHODS AND DEVICES FOR MANAGING A NETWORK

TECHNICAL FIELD OF THE INVENTION

The present invention relates to a network technique, and more particularly to the effective use of network resources.

BACKGROUND OF THE INVENTION

Quality of Service (QoS) is an important factor for a network to provide a good user experience, especially when all network devices of a wireless network share channel(s). For example, the infrastructure mode based IEEE 802.11g wireless network that is widely used at present has a bandwidth of 54 Mbps.

As shown in FIG. 1, a media server 102 is connected to a TV 103 via a wireless router 101. Since packets sent from the media server 102 need to be sent to the wireless router 101 through the uplink channel 11, and then sent to the TV 103 through the downlink channel 12, and since the uplink and downlink channel are time-division multiplexed, a video stream from the media server 102 to the TV 103 has a maximum bandwidth of 27 Mbps, and the actually available bandwidth for a video stream is smaller due to the obstruction and attenuation of the signals caused by the network environment.

In addition, experiments show that an H.264 compressed, typical high-definition video stream of 1080p needs a bandwidth of 20 Mbps for transmission, as a result, a 802.11g wireless network can accommodate only one high-definition video stream. If other applications requiring large bandwidth also use the network for transmission at the same time and the network does not provide any QoS, it is sure that the play of the video stream will be affected.

Many QoS techniques have been proposed to solve the problem of the allocation of limited resources in a network. Currently prevailing QoS techniques can generally be divided into two types: prioritized QoS and parameterized QoS.

The prioritized QoS marks data packets to be sent according to priorities requested by a user and transmits them in a different priority order, i.e. the data packets marked with higher priority are transmitted in preference to the data packets marked with lower priority. An example of the prioritized QoS is EDCA (Enhanced Distributed Channel Access) in IEEE 802.11e. Although the data packets with high priority are transmitted by preference, data packets having the same priority are still involved in transmission contention.

By contrast, the parameterized QoS reserves some network resources before the transmission starts, HCCA (Hybrid Controlled Channel Access) in IEEE 802.11e being an example of this. Each of the traffic streams needs to provide a TSPEC (Traffic Specification) to send a request to the Hybrid Coordinator in a network before transmission starts. Said Hybrid Coordinator will check to see if the current network status permits said request; if it does, said request by the traffic stream is accepted, and the Hybrid Coordinator allocates to said traffic stream a specific time interval for network transmission, in which period no other stream is allowed to contend with said traffic stream, so it is a contention-free protocol.

The effectiveness of a QoS technique depends on support from lower layer protocol(s) (e.g. physical layer and media access layer in the Open System Interconnect OSI model). However, a lower layer protocol only knows that there are data packets to be transmitted, but it does not know from which application said data packets originate, what kind of priority should be used, or which resources should be reserved. Therefore, the cooperation of upper layer protocol(s), such as providing parameters on the transmission characteristics requirement of the traffic streams and configuring network devices according to these parameters, is necessary to implement the QoS effectively.

The QoS standardization carried out in UPnP (Universal Plug and Play) and IGRS (Intelligent Grouping and Resource Sharing) serve the purpose of defining a set of standard interfaces in an upper layer, so that an upper layer application can invoke the QoS functions provided by a lower layer through said interfaces uniformly. Upper layer herein may refer to network layer, transmission layer, application layer, etc.

The QoS specifications of both UPnP and IGRS are policy-based QoS and define three types of services: QosPolicyHolder service, hereinafter referred to as QPH service, QosManager service, hereinafter referred to as QM service, and QosDevice service, hereinafter referred to as QD service.

QPH service defines a repository of policies of a QoS system; QM service defines management functions of a QoS system; and QD service of a given device defines an interface for setting QoS parameters of the given device.

QM service queries a policy holder with a traffic descriptor, which is provided by a control point when the control point requests to establish a traffic stream, and returns the traffic descriptor allowed by the present system policy holder; the control point executes corresponding QoS actions by invoking the functions of QM; and QM invokes the functions of QD to configure QoS parameters of all devices having implemented the QD service on the transmission path of the traffic stream. Corresponding devices in networks can implement the above-mentioned three types of services to provide corresponding functions. The control point herein may refer to a program or a device defined in UPnP and IGRS specifications which has the function of controlling a device (i.e. invoking the relevant services of the device). For example, a control point may be an audio/video application or a multimedia player installed with the audio/video application.

FIG. 2 depicts the general operation sequence of UPnP and IGRS QoS systems.

A traffic stream may be transmitted directly between the source device and the sink device, and then only two devices are involved in said transmission path.

The traffic stream may also be routed through several network nodes, in which case the transmission path is from the source device to the sink device and through several intermediate devices, which path involves a plurality of devices.

In FIG. 2, a control point CP (which may be an application or a device) initiates a traffic stream transmission from a source device 201 via an intermediate device 202 to a sink device 203.

In an UPnP/IGRS audio/video application, for example, the control point CP may be an audio/video control application; the source device 201 is a media server device, and the sink device 203 is a media renderer/media player Device.

The control point CP provides a Traffic Descriptor (which may include the IP address of the source device 201/sink device 203, the application port, and the average data rate, the peak data rate, the maximum packet length, the maximum allowed time delay of a traffic stream, etc.) in requesting the QM service to establish a transmission.

The QM service uses the traffic descriptor (which may be incomplete) to request the QPH service, the QPH service will check the policy holder and return a matched complete traffic descriptor.

The QD service of a device can provide path information of the traffic stream in which the device is involved according to the link information on network interfaces of the device where it resides. The QM service derives a network topology from the path information provided by the QD service, determines the transmission path of the traffic stream between the source device and the sink device, and configures each of the QD service on the transmission path using the obtained traffic descriptor, i.e. configures the QD service of the device 201, device 202 and device 203.

If the configuration is successful, the QM service will return a status of success to the control point, and then the actual transmission starts.

In a network with QoS, however, some network devices may suddenly fail, such as, disconnected from the network, as a consequence, if the network resources allocated to the failed device cannot be released in time, it will not only lead to a waste of resources, but also cause other devices that require resources to be unable to work properly due to the lack of resources. This problem is particularly notable in parameterized QoS, because the resources are allocated before the actual transmission starts.

Both UPnP QoS and IGRS QoS define a traffic lease time in the QD service specification to ensure that relevant resources can be released in time when a device fails in the network. The traffic lease time defines a time interval in which a traffic stream can use the resources allocated thereto. If the traffic stream needs to continue the use of the allocated resources, the control point has to update the value of the traffic lease time to ensure occupancy of the allocated resources before it expires. If some devices having implemented the QD service fail and the allocated resources cannot be properly released at once, the relevant traffic stream will automatically release the occupied resources when the traffic lease time expires. But if the traffic lease time is set to be too long, and if there are some devices that frequently join and leave the network, it will cause the network resources not to be released in time; whereas if the traffic lease time is set to be too short, too many network resources will be needed to update the traffic lease time, resulting in a heavy load on the network.

SUMMARY OF THE INVENTION

The present invention provides methods and devices to solve the problem of release of resources in case of a network device failure.

Device failure herein refers to a situation that a device is unable to work properly, including power down of the device, the device disconnected from a network, having malfunction of software and hardware inside the device, etc.

From a first aspect of this invention, a method of managing a network is proposed. The network comprises a set of devices for transmitting a traffic stream using network resources. Wherein, each device of the set of devices is individually associated with an expiration time. The expiration time defining a maximum interval of sending a message by a given device among the set of devices for indicating the given device is connected with the network. The method comprises a step of determining, based on the expiration times of the set of devices, a transmission lease time defining duration of using said network resources.

From a second aspect of this invention, a manager device for managing a network is proposed. The network comprises a set of devices for transmitting a traffic stream using network resources. Wherein, each device of the set of devices is individually associated with an expiration time. The expiration time defining a maximum interval of sending a message by a given device among the set of devices for indicating the given device is connected with the network. The manager device comprises a unit for determining, based on the expiration times of said set of devices, a transmission lease time defining duration of using said network resources.

By applying the proposed methods and devices, the network resources can be released faster when there is a transmission failure during the transmission of traffic streams.

Other objects of the invention will be described below in conjunction with the following description and drawings.

BRIEF DESCRIPTION OF THE DRAWINGS

The above and other objects and features of the present invention will become more apparent from the following detailed description considered in connection with the accompanying drawings, in which.

DESCRIPTION OF EMBODIMENTS OF THE INVENTION

Figure 1:
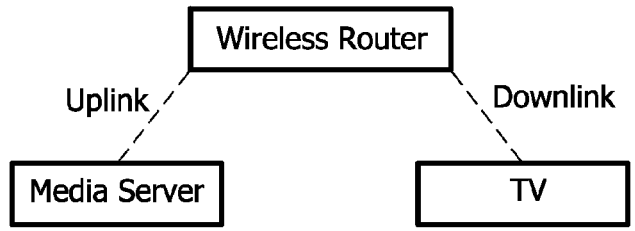
FIG. 1 shows a known transmission path from a source device to a sink device.
Figure 2:
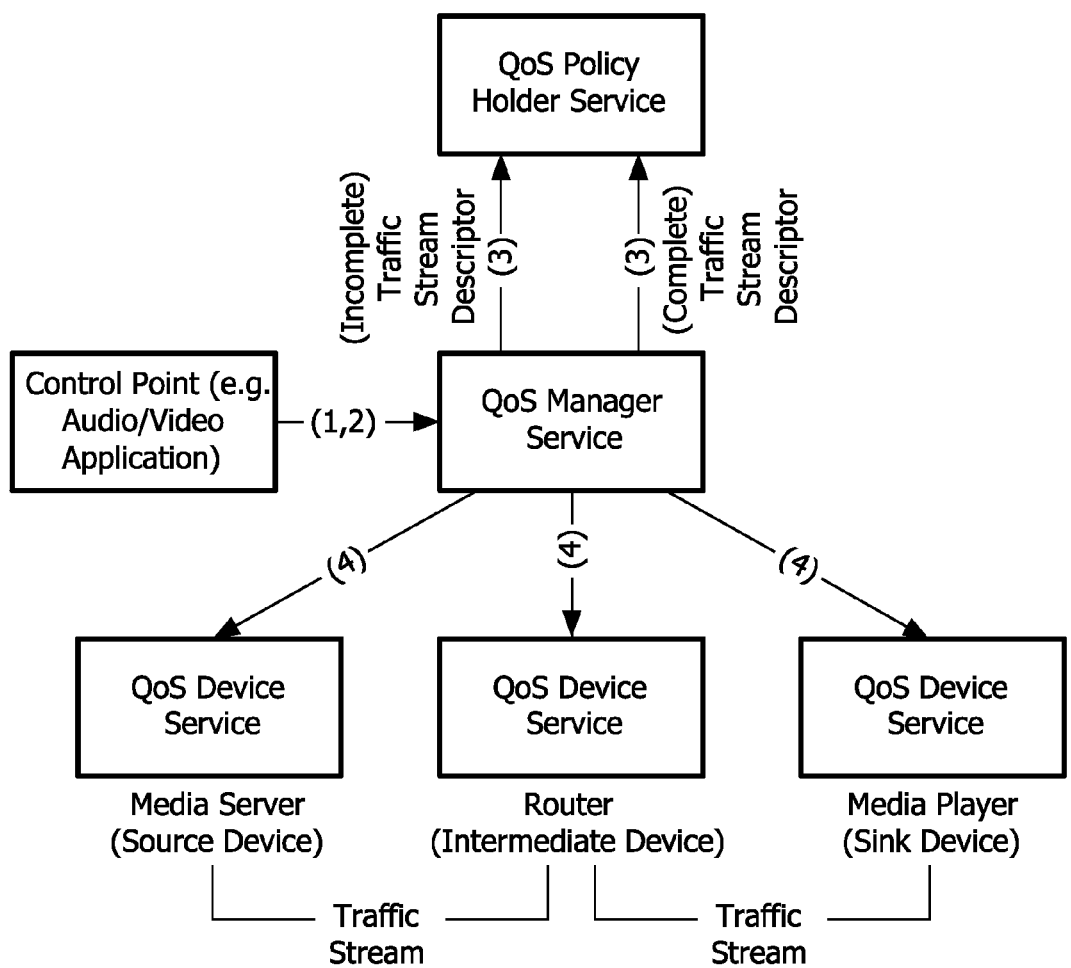
FIG. 2 shows a general operation sequence of a UPnP/IGRS QoS system.
Figure 3:
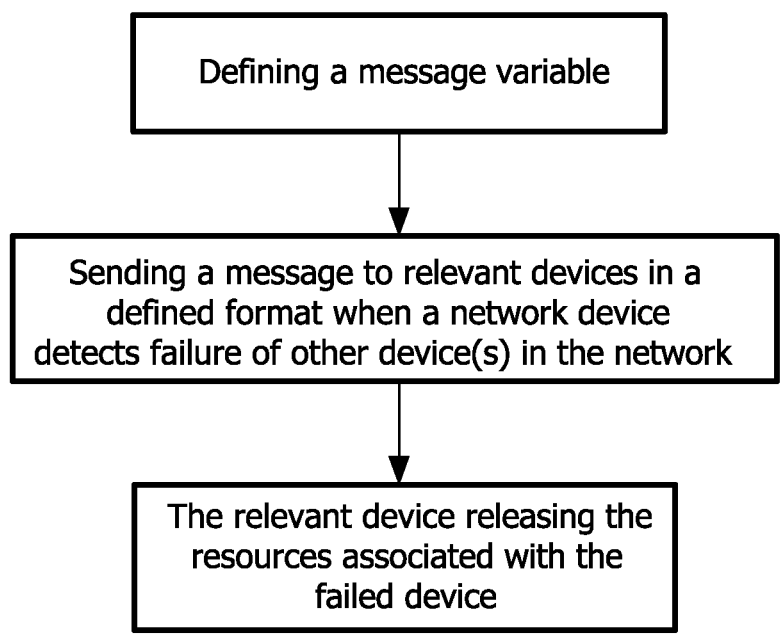
FIG. 3 depicts an example of a set of traffic streams being transmitted by a set of devices within a network according to one embodiment of the invention.

FIG. 3 is an example of a plurality of traffic streams being transmitted within a network 30. A device M, a device H, a device N, a device K and a device J are involved in transmitting traffic streams T1, T2, T3, and T4 separately.

Wherein, traffic stream T1 is transmitted via device M to device H, and to device N;

Traffic stream T2 is transmitted from device M to device H;

Traffic stream T3 is transmitted via device J to device H, and to device K;

Traffic stream T4 is transmitted from device H to device K.

Figure 4:
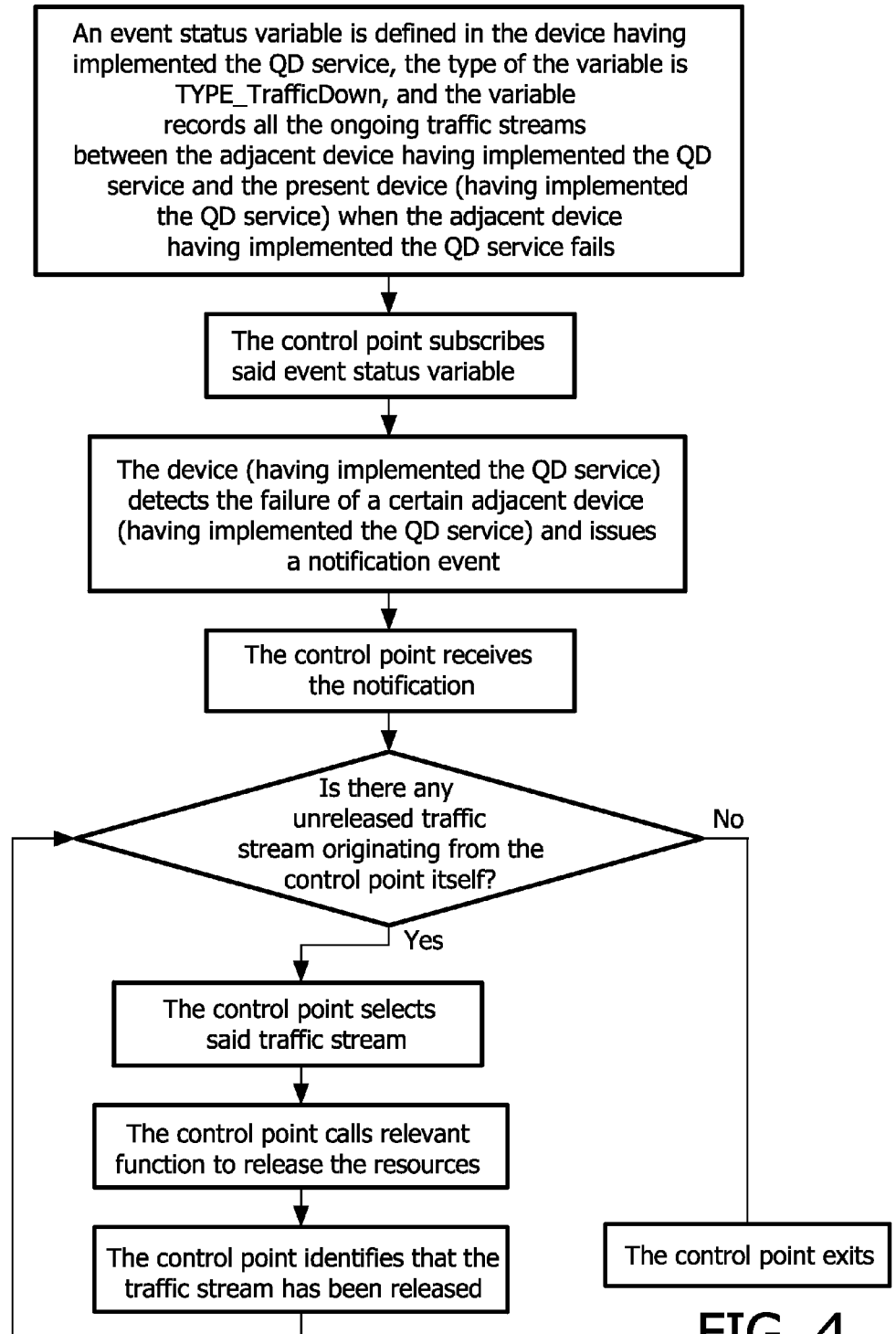
FIG. 4 depicts a flowchart of the first method according to one embodiment of the present invention.

FIG. 4 is a flowchart of a first method for managing a network according to the present invention. In the following, the method is described in detail based on FIG. 3 and FIG. 4.

The first device M comprises a first unit (not shown in the figures) for detecting 5401 a transmission failure of the second device H when the second device H transmits a set of traffic streams (i.e. T1, T2, T3 and T4) using network resources. Although for illustrating the invention, the device M is referred to a first device and the device H is referred to a second device, it is to be understood that any device in the network may be act as a first device, and any device in the network may be a second device.

The detection of the transmission failure of a device (it is also referred to a device failure or a failed device) can be performed in different ways. A network device may detect an adjacent device failure in some ways and a non-adjacent device failure in some other ways.

An adjacent device is a device that has a direct physical connection to a network interface of the present device. A non-adjacent device is a device that does not have a direct physical connection to a network interface of the present device, but can be interconnected thereto via other, intermediate devices. For example, if two computers are interconnected by a switch, then the switch is an adjacent device to both of said computers, but said two computers are non-adjacent devices. In FIG. 3, the first device M and the second device H are adjacent devices, but the first device M and the device N are non-adjacent devices.

The first device M can detect the failure of an adjacent device by means of the protocol of a data link layer, such as the event that the first device M does not receive a response after sending a data link layer frame to an adjacent device and requiring a response.

The first device M can detect the failure of non-adjacent devices by means of the protocol of the network layer or the layer above the network layer, such as the event that the first device M does not receive a response after sending an IP datagram to a non-adjacent device and requiring a response.

A specific device (e.g. a server) may be arranged in the network to check the failure status of all devices in the network periodically.

The first device M further comprises a second unit (not shown in the figures) for sending S402 a first message for indicating the detected transmission failure.

If the first device M detects that a plurality of devices fail simultaneously, for example in a case where five computers are connected to a switch and thus the five computers are all adjacent devices of the switch, and the switch finds that a plurality of computers fail, it can issue a plurality of first messages, or it can combine the contents of a plurality of first messages into one first message and send it.

It is to be understood that the type of the first message sent by the first device M may be pre-defined as a variable for a network device.

The message according to the present invention may be defined as an event message or a broadcast message, or any other suitable message. The content of the message should include the failed device ID (identifier) which is referred to: UDNDeviceID, and the device ID is a unique device identification string corresponding to the failed device.

For example, an event variable is defined as the first message in a device having implemented the QD service, the event variable is referred to: TYPE_TrafficDown. The event variable records a device ID (identifier) of the device (having implemented the QD service) that is detected as failed.

When the second device H fails, the first device M will detect the failure of device H and issue an event with the following event content ---
Event_Content = {
  device H;
};
---

Advantageously, the message may further include a traffic handle list of all the ongoing traffic streams associated with the failed device (the second device H) that are known to the first device M (having implemented the QD service). A traffic handle of a traffic stream is the unique identifier corresponding to a traffic stream descriptor. The traffic handle of a traffic stream is referred to: TYPE_TrafficHandle.

For example, the event content is:

---
Event_Content = {
  device H;
  T1, T2;
};
---

In this example, a device or service that receives the event will learn that device H is failed while traffic streams T1 and T2 with device M are ongoing.

As described above, the present method can use not only an event to report the failure of devices in a network, but also use a broadcast message to report the failure of devices in the network. When the first device M (having implemented the QD service) detects the failure of a certain device having implemented the QD service in the network, such as the second device in the example of this invention, the first device M broadcasts a notification message for indicating the transmission failure of the second device H.

The first message is intended to be used by the network devices for releasing S403 the network resources, in other words, to cancel the previous allocated network resources. In this example, the previous network resources is the resources allocated for transmitting the traffic streams T1, T2, T3 and T4, meaning that the released network resources can be used by other devices in the network for transmission other traffic streams or any other purpose.

The step S403 of releasing resources is to utilizing the functions of a QoS system to release resources. Multiple devices may be involved in performing the step S403 of releasing resources.

A control point (hereinafter a control point is referred to a control device) or any other device in the network can subscribe to the first message if it is an event message or detect the first message if it is a broadcast message. When a control device requests a traffic stream and the QoS system permits the establishment of said traffic stream, the request of the control device succeeds and a traffic handle that uniquely identifies said traffic stream can be obtained; each control device will record the traffic handle of the traffic stream initiated by it.

Figure 5:
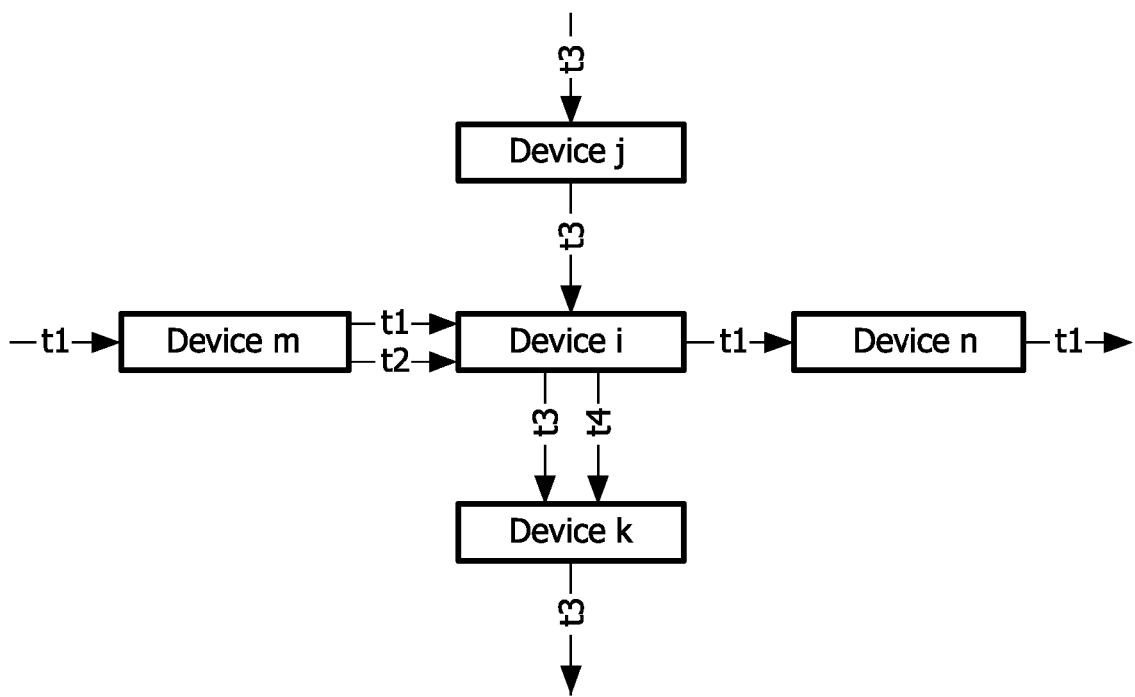
FIG. 5 depicts a flowchart of the first method according to another embodiment of the present invention.

In the example of FIG. 3, it is assumed, for example, the device K is a control device. FIG. 5 depicts a flow chart illustrating the process of releasing the network resources.

In FIG. 5, the control device K comprises a unit (not shown) for receiving S501 a first message sent from the first device M for indicating a transmission failure of the second device H when the second H device transmits a set of traffic streams using network resources.

After a control device receives the first message, the control device further comprises a unit for determining S502 a set of affected traffic streams that are transmitted by the second device H (the traffic streams which are transmitted via the failed device is referred to "the affected traffic streams", the device that are involved to transmit the affected traffic streams is referred to "the affected device").

If the content of the event includes only a device ID associated with said failed device, the control device may determine the set of traffic streams by calculating a list of traffic handles of the traffic streams associated with said failed device and originated from the control device K on the basis of the network topology.

Optionally, a third device in the network for example the device J comprises a unit (not shown) for receiving S601 the first message. When the device J receives a first message, the third device J knows some traffic streams that are transmitted by the second device H (failed device), the third device J may comprise a unit for sending (S602) a second message indicating the affected traffic streams it knows. The determining step S502 determines the set of affected traffic streams in accordance with the second message.

If the content of the first message includes a list of traffic handles of traffic streams associated with the failed device, the control device determines S502 the affected set of traffic streams directly according to the traffic handle list.

After the set of traffic streams are determined, the releasing step S403 is performed.

As shown in FIG. 5, the control device K comprises a unit for invoking S503 a release function of QM for releasing resources which are allocated for transmitting the set of traffic streams T1, T2, T3 and T4, wherein the function of QM is referred to: ReleaseTrafficQos( ).

And then, the QM service in the network invokes S504 a release function of QD corresponding to each of a set of devices affected by the transmission failure of the second device for releasing the network resources occupied by each of the affected devices (i.e. the device M, the device N, the device K, and the device J). The function of QD for releasing resources is referred to: ReleaseAdmittedQos( ).

When the release function of QD of each affected devices is invoked, each affected devices implements individually a step S505 to release the resources occupied by each of the affected devices.

It is to be understood that the control device K is just an example for illustrating the principle of the invention; the control device may not be one of the affected devices, many other devices in the network may be the control device.

In the context of the present invention, the network resources are the resources managed by a QoS system, for example: it may be a communication channel, such as, a certain frequency band, or buffer, or memory in a network interface device. A certain resources are allocated for transmitting a traffic stream means that the involved network devices have the right to use the allocated resources when transmits the traffic stream. In a time-division multiplexing system, the allocation of the resource may also be the allocation of the time interval (i.e. duration) of using the resources.

Different resources have different ways to release. For example, if the allocated network resource is the time interval of using a communication channel, the release of said resource may be realized by giving back said time interval to the QoS system or by canceling the allocation of the time interval of using the communication channel, so that the QoS system can figure out that said time interval is no longer occupied, and as a result, the QoS system can allocate this resources to other device or service.

In another example, if the resource is a buffer in a network interface device, the release of said resource may be the clearance of said buffer by the QoS system.

It is to be understood that the units for implementing the steps mentioned above can be implemented either by software or by hardware or by the combination of both. For example, it may be implemented by a microprocessor associated with a memory in which the related instruction code is stored. The devices mention in this invention, i.e. the first device, the second device, the third device, and the control device, may be any type of devices being capable of connecting to a network. For example, it may be a media player, a personal computer, a server, a router, a printer, a fax machine, etc. Sometimes, one device may act as a first device to detect the failure of other devices; sometimes, when it fails it is the second device; and it may also act as a control device or a third device in different circumstances.

It will be appreciated that the first method using a message mechanism to release the resources proposed in the present invention is applicable to any device in the network, which means that 1. the definition of the message in the present invention is applicable to any device in the network, that is, any device can send a first message having a pre-defined message type;

2. the detection of a failed device can be carried out for adjacent devices or non-adjacent devices, or for all devices in the network;

3. even if a device in the network does not implement the QD service, the device can immediately release corresponding resources in response to the first message as long as the first message can be received through a certain mechanism and there is a traffic stream being transmitted with the failed device (which may not implement the QD service).

In other words, for different reasons, some devices in the network may not be able to release network resources in the circumstance of above mentioned transmission failure, therefore, a second method is proposed for managing the network resources.

The second method for managing the network is proposed by the present invention.

In the known technology, the device needs to announce periodically that it is on-line, which on-line announcement is implemented by sending multicast messages (i.e. the message for indicating that the device is connected with the network) to a specific network address, for example, "239.255.255.250:1900".

The expiration time defined for the on-line announcement message indicates a maximum time interval between two on-line announcement messages sent by the device. In the known technology, for example, in UPnP and IGRS, all devices are required to periodically broadcast the on-line announcement messages before the expiration time ends. Meaning that starting from the time that a first on-line announcement message of a given device is received by a network device, if the duration of the expiration time is reached, there is no a second on-line announcement message being received, the given device is deemed to be disconnected or off-line from the network.

It is recommended that a relatively long expiration time (e.g. 1800 s) should be set for devices that are relatively stable in the network, while a relatively short expiration time (e.g. 30 s) should be set for devices that frequently join and leave the network. Thus unnecessary on-line announcement messages of the device are reduced and the information on the dynamic change of network topology can be obtained in time.

A control device will listen to (detect) the address and record the devices of interest when receiving on-line announcement messages of the devices. If the control point does not receive an updated on-line announcement message of a device before the end of the expiration time, the control device deems that said device is off line.

Generally speaking, manufacturers or users will set the expiration time in dependence on the characteristics (stability) of the devices, which will be comparatively long. For example, many computer manufacturers will set the expiration time to be 120 seconds, while for a user who is watching the streaming media sent from a PC to a multimedia player, an interval of 120 seconds with nothing to play would be intolerable.

According to the above definition of the expiration time, it can be assumed that the expiration time is a time parameter associated with the device characteristics. It is to be understood that the characteristics associated with the device may be described by different parameters in different network structures, and many parameters can be used to achieve the object of the present invention as long as they are of the same nature.

In order to release resources, a traffic lease time has been defined in UPnP QoS and IGRS QoS, and this parameter defines a time interval in which the traffic stream can use the resources allocated thereto. The control device needs to update the value of the traffic lease time periodically to ensure occupancy of the allocated resources. If a certain device (having implemented the QD service) fails in providing the service, the resources allocated thereto will not be released immediately; on the contrary, the relevant traffic stream will automatically release the occupied resources after the traffic lease time has expired. However, the present definition of the traffic lease time does not state how to set a reasonable traffic lease time, thus the traffic lease time cannot function effectively in the release of resources.

To solve this problem, the present invention proposes a more effective second method and a manager device of releasing resources in time.

The present invention proposes an intelligent method that sets duration within which a traffic stream can use the resources allocated thereto according to the characteristics of all devices in the transmission path of the traffic stream. The characteristic of the devices as mentioned herein may be the stability of the devices.

As described above, an expiration time is usually set according to the characteristics of the devices, so the expiration time may be regarded as a parameter associated with the device characteristics. Similarly, as was noted above, the traffic lease time is a parameter defined in some standards concerning a time interval in which the traffic stream can use the resources allocated thereto.

The network comprises a set of devices for transmitting a traffic stream using network resources. Each device of said set of devices is individually associated with an expiration time. The expiration time defines a maximum interval of sending a message by a given device among said set of devices for indicating that said given device is connected with said network. The proposed method comprises a step of determining a transmission lease time based on the expiration times of said set of devices. The transmission lease time defines duration of using said network resources. The core idea of the present invention will be described below with reference to the traffic lease time and the expiration time in various embodiments.

For implementing the method, a manager device is proposed by the present method. The manager device comprises a unit for determining a transmission lease time based on the expiration times of said set of devices. The transmission lease time defines duration of using said network resources.

Optionally, the setting of the traffic lease time may be based on the minimum value of among the expiration times of the set of devices.

The traffic lease time may also be set according to an average value of the expiration times of said set of devices.

The traffic lease time may also be set according to an intermediate value among the expiration times of said set of devices.

The traffic lease time may also be set according to a time value obtained by performing any reasonable mathematical operation on the expiration times of all devices in the transmission path, for example the root mean square, etc.

The principle of the present invention will be illustrated with reference to the setting of the traffic lease time according to the minimum value of the expiration times of all devices in the transmission path as an example. The steps thereof are as follows:

(1) A QM service determines the set of devices having implemented the QD service in the transmission path of the traffic stream between the source device and the sink device, which are represented as {device_source, device_1, device_2, . . . , device_n, device_sink}.

(2) The QM service obtains the expiration time of each of the devices of step (1) from the on-line announcement messages of the respective devices, which are represented as {et_source, et_1, et_2, . . . , et_n, et_sink}, respectively.

(3) The QM service calculates the minimum value among {et_source, et_1, et_2, . . . , et_n, et_sink} and uses said minimum value as the traffic lease time, as shown in equation (E1), wherein min ( ) is an operation for taking the minimum value.

$$t1=\min(et\_source,et\_1,et\_2,\ldots,et\_n,et\_sink) \quad (E1)$$

Alternatively, the traffic lease time may be randomly set to be any value between the range of an upper limit value and a lower limit value which are written as Time_threshold_above and Time_threshold_below, respectively. Said upper limit value and lower limit value may be determined experientially or according to the characteristics of the network, or be set by users or the device manufacturer.

In the above examples of setting the traffic lease time according to the expiration time, the range of the traffic lease time values may be further limited between the pre-set upper limit value and lower limit value as mentioned above to ensure that said traffic lease time will not be too long or too short. The specific equations are (E2) and (E3) below:

$$t2=\min(t1,\text{Time\_threshold\_above}) \quad (E2)$$

$$t3=\max(t2,\text{Time\_threshold\_below}) \quad (E3)$$

Wherein Time_threshold_below, and Time_threshold_above may be 30 seconds and 60 seconds, respectively. t3 may be calculated with the above equations, and the QM service will set the traffic lease time for the device according to the value of t3.

After setting the traffic lease time, the control device will periodically update the traffic lease time during the transmission of the traffic stream through the QM service according to the UPnP QoS and IGRS QoS specifications.

The second method of the present invention takes into account the characteristics of the devices in the transmission path of each traffic stream (the on-line time for a stable device is long, while the on-line time for a unstable device is short), therefore, the network resources are released in time without heavily loading the network.

If any device (having implemented the QD service) in the transmission path cannot work properly, the device will automatically release the network resources occupied by the traffic stream after the traffic lease time has expired.

For example, if a device in which the control point resides fails, the control point cannot update the traffic lease time of the QD services in the transmission path of the traffic stream initiated by it, and said QD services will automatically release the resources occupied by the relevant traffic stream after the traffic lease time has expired.

Another example: if a device having implemented the QD service in the transmission path of the traffic stream fails, the invoked function of the control point for updating the traffic lease time of the QD service implemented by said device cannot be returned successfully, and the control point knows that said device has failed and accordingly releases the resources occupied by the relevant traffic stream.

It is to be understood that the above embodiments merely serve to illustrate the principle of the method and should not be construed as limiting the invention. Not only the expiration time can be used to set the traffic lease time in the present invention, but any other parameter according to different network structures and network protocols consistent with or similar to the definitions of said expiration time and traffic lease time may be used with the present invention.

It is to be understood that the first method (i.e. the method of sending a first message for indicating a transmission failure of a device) and the second method (i.e. setting the traffic lease time in which the traffic stream can use the resources in dependence on the devices in the transmission path) as recommended by the invention may be used either separately or in combination. The use of these two methods in combination implies a simultaneous use of the message mechanism of the first method and the setting of the "traffic lease time" with the minimum "expiration time" of the second method. Such a combination can ensure that the network resources are quickly released even when the first method cannot be used effectively in some devices (for example, some devices do not have the capability to detect and cannot send messages).

There are numerous ways of implementing functions by means of items of hardware or software, or both. In this respect, the drawings are very illustrative, each representing only one possible embodiment of the invention. Although a drawing shows different functions as different blocks, this by no means excludes that a single item of hardware or software carries out several functions. Nor does it exclude that an assembly of items of hardware or software or both carry out a function.

The remarks made hereinbefore demonstrate that the detailed description with reference to the drawings illustrates rather than limits the invention. There are numerous alternatives that fall within the scope of the appended claims. Any reference sign in a claim should not be construed as limiting the claim Use of the verb "comprise" and its conjugations does not exclude the presence of elements or steps other than those stated in a claim. Use of the indefinite article "a" or "an" preceding an element or step does not exclude the presence of a plurality of such elements or steps. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of managing a network, wherein the network comprises a set of devices for transmitting a traffic stream between a source device and a sink device of said set of devices using network resources, each device of said set of devices being individually associated with an expiration time, said expiration time defining, for a respective given device, a maximum time interval of sending a message by the given device among said set of devices, the message for indicating said given device is connected with said network, said method comprising:
   determining, based on the expiration times of all devices of said set of devices in a transmission path of the traffic stream between the source device and the sink device, a transmission lease time; and
   wherein the determined transmission lease time defines a time duration of using said network resources for transmitting the traffic stream between the source device and the sink device in the transmission path; and,
   responsive to (i) any device of the set of devices in the transmission path not working properly by not sending a respective message by a corresponding expiration time indicating that said given device is connected with said network, and (ii) a control device of the set of devices failing to update the determined transmission lease time during use of said network resources for transmitting the traffic stream in the transmission path, automatically releasing said network resources occupied by the traffic stream between the source device and the sink device after the determined transmission lease time has expired, wherein said transmission lease time is determined according to one selected from the group consisting of:
   a minimum value among the expiration times of all devices of said set of devices in the transmission path of the traffic stream;
   an average value of the expiration times of all devices of said set of devices in the transmission path of the traffic stream; and
   an intermediate value among the expiration times of all devices of said set of devices in the transmission path of the traffic stream.

2. A manager device of managing a network, wherein the network comprises a set of devices for transmitting a traffic stream between a source device and a sink device of said set of devices using network resources, each device of said set of devices being individually associated with an expiration time, said expiration time defining, for a respective given device, a maximum time interval of sending a message by the given device among said set of devices, the message for indicating said given device is connected with said network, said manager device comprising:
   a unit for determining, based on the expiration times of all devices of said set of devices in a transmission path of the traffic stream between the source device and sink device, a transmission lease time; and
   wherein the determined transmission lease time as defines a time duration of using said network resources for transmitting the traffic stream between the source device and the sink device in the transmission path; and,
   a unit, responsive to (i) any device of the set of devices in the transmission path not working properly by not sending a respective message by a corresponding expiration time indicating that said given device is connected to the network, and (ii) a control device of the set of devices failing to update the determined transmission lease time during use of said network resources for transmitting the traffic stream in the transmission path, for automatically releasing said network resources occupied by the traffic stream between the source device and the sink device are automatically released after the determined transmission lease time has expired, wherein said transmission lease time is determined according to one selected from the group consisting of:
   a minimum value among the expiration times of all devices of said set of devices in the transmission path of the traffic stream;
   an average value of the expiration times of all devices of said set of devices in the transmission path of the traffic stream; and
   an intermediate value among the expiration times of all devices of said set of devices in the transmission path of the traffic stream.

* * * * *